Jan. 13, 1931.  E. O'TOOLE  1,789,252
AIRPLANE AND PROPELLER
Filed March 27, 1929    2 Sheets-Sheet 1
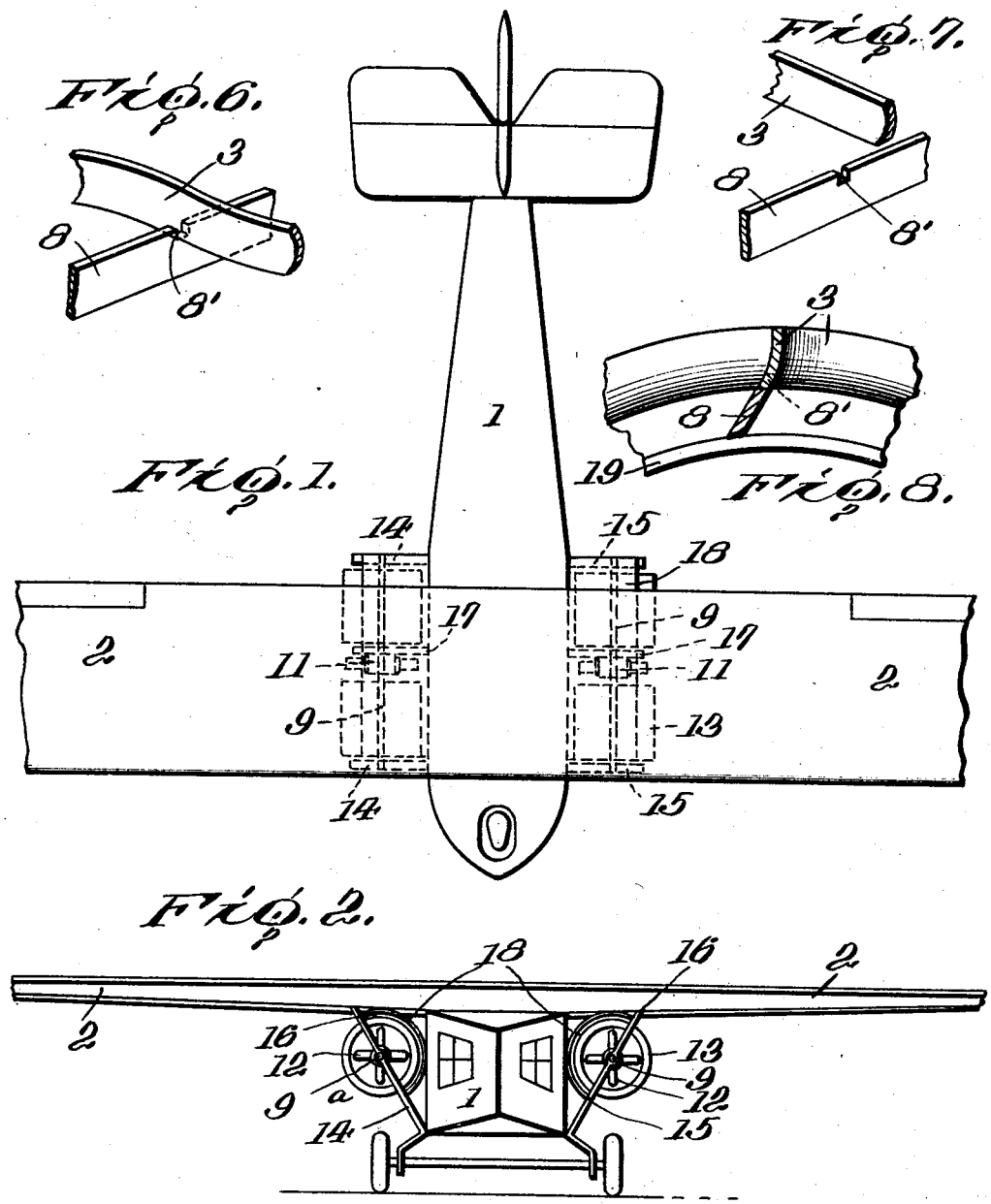

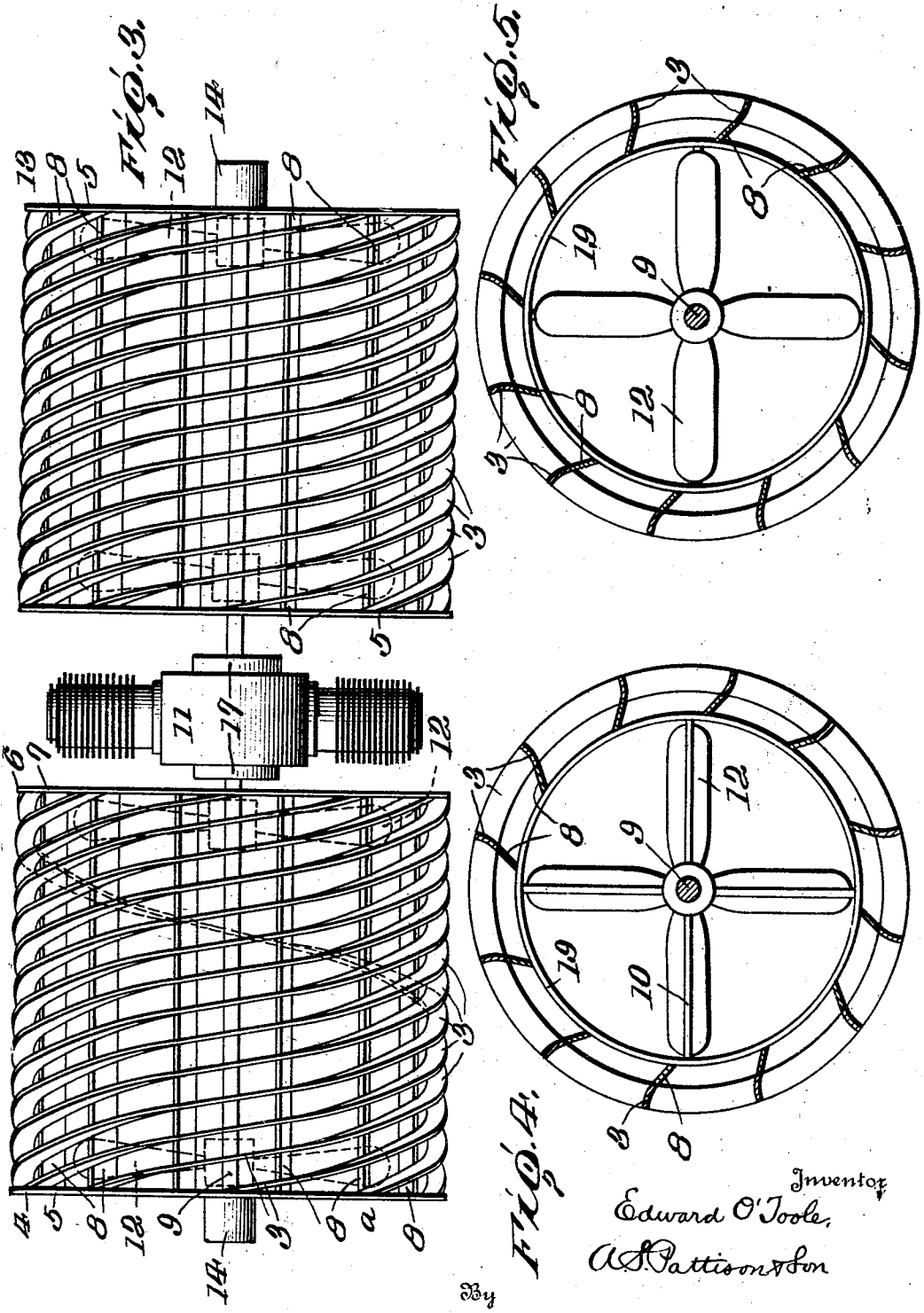

Patented Jan. 13, 1931

1,789,252

UNITED STATES PATENT OFFICE

EDWARD O'TOOLE, OF GARY, WEST VIRGINIA

AIRPLANE AND PROPELLER

Application filed March 27, 1929. Serial No. 350,216.

This invention relates to certain improvements in airplanes and propellers which will be particularly described hereinafter.

The primary improvement pertains to a new form of horizontal propeller that is so constructed and arranged on the plane, as hereinafter explained, that it moves the plane forward.

Another object of the improvement is to so arrange a plural number of these propellers in respect to the fuselage of the airplane and to so construct and revolve the propellers that they serve to balance the plane.

A further object of the present improvement consists in so constructing the propellers that when arranged in duplicate form that the lifting power of one propeller balances the lifting power of the other propeller, while at the same time serving to propel the airplane.

Another object of the improvement is in so constructing the propellers and their driving power, and in locating them at opposite sides of the fuselage, and at the same time to so arrange and revolve the propellers that the lifting effect of one balances the lifting effect of the other, and at the same time drive the airplane forward.

A further improvement pertains to making a horizontally elongated propeller which is so constructed that it has the dual effect of lifting the plane and of propelling the same.

Another object of the improvement relates to mounting the said horizontally elongated propellers at each side of the fuselage the propellers revolving in opposite directions whereby the lifting power of one propeller serves to balance the lifting power of the other propeller while at the same time the same propeller or propellers serve to move the plane forward.

A further object of the improvement is to so construct the propellers that they are in length approximately equal to the width of the usual wings of the airplane, whereby the propellers and their motors are so located as to substantially balance the airplane while in flight.

Another object of this improvement relates to mounting the said propellers in tandem located at opposite sides of the fuselage of the airplane with a driving motor located between the propellers, whereby said propellers and their motors serve to balance the airplane when in flight.

Another object in constructing the propellers in the manner above described is to adapt them so that they will act for propelling other bodies such for instance as a boat and the like and in fact may be used for numerous purposes.

Other objects of the present improvement will be understood from the following description.

In the drawings:

Figure 1 is a plan view of an airplane with my present improvement mounted thereon and shown in dotted lines.

Figure 2 is an end view of the airplane with my improved motors mounted thereon at opposite sides of the fuselage.

Figure 3 is an enlarged separate view of a pair of propellers and a motor which are located at opposite sides of the fuselage, the particular motor shown being mounted on the left hand side of Figure 1.

Figure 4 is an end view of Figure 1 looking in a direction opposite to the direction of propulsion shown in Figure 3.

Figure 5 is a cross sectional view of one of the motors.

Figure 6 is an enlarged segmental perspective view of a portion of one of the propellers showing the manner of connecting the longitudinal and the spiral blades.

Figure 7 is a sectional perspective view of the propellers showing the blades and the bars in separated relation.

Figure 8 is an enlarged sectional view showing the blade 3 and the bar 8 in their respective relation.

Referring now to the accompanying drawings in which 1 is a suitable airplane fuselage which has at its forward portion wings 2 located above the fuselage and extending to opposite sides of the said fuselage.

The construction with which I have chosen to show my propellers applied is a monoplane airship. I desire it understood however, that the present improvement may be applied to a biplane or to any other similar type, or in fact the propellers may be utilized for driving a dirigible type of machine.

Owing to the fact that my improved propellers have the dual effect of lifting or tending to lift the body to which they are attached and to also propel the body, it will be observed that the improved propellers can therefore be applied with advantage to the dirigible type of machine and thereby lessen the amount of gas or other lifting power required for the dirigible. In fact these propellers are therefore particularly adapted to be applied to any type of structure adapted to sustain itself in the air and also propel itself in the air.

Describing now particularly my present improvement in addition to the particular location of the propellers when applied to a monotype plane or to a bi-type plane, it will be noted that the propellers are supported in relation to the wings and fuselage of the planes herein shown and hereinbefore mentioned.

The propeller is tubular in form as shown in Figures 4 and 5.

Referring particularly to Figures 3, 4, and 5, this tubular arrangement consists of annular arranged blades represented by 3 and that these blades are arranged to form the tubular arrangement. By referring to Figure 3 it will be observed that these blades consist of spirally arranged blades the spiral being arranged whereby it serves to propel the body to which it is attached. By reference to Figure 3 it will be seen that the blades compared with their length are very narrow and that they are arranged in a plural number. Taking for instance Figure 3 and describing a single blade 3, it will be observed that its end 4 is attached to an annular plate 5 and the blade arranged to extend outward and that the plate is arranged in spiral form and has its opposite end 6 attached to an annular plate 7 similar to the annular plate 5.

This is describing only one of the blades but since these blades are arranged in plural form there may be as many or as few as is desired or required for the purpose in hand. Furthermore the spiral arrangement of these blades may be such as to have the pitch of the spiral gradually increase from its forward end 4 to its rear end 6 as circumstances may require for the best results. The inner edges of these tubular arranged blades 3 are connected with horizontally arranged bars 8 and the ends of these bars 8 are suitably attached also with the plates 5 and 7. These bars 8 are made of relatively thin and hence relatively light material. By reference to Figures 4 and 5 these bars 8 consist of sheet metal or other material and they are formed preferably straight in cross section, the purpose of which will be presently described. There will be as many of these bars 8 around the circumference of the said tubular section a as desired or required to carry out the function which will be hereinafter referred to.

Attention is directed to the fact that the plates 8 as specifically shown in Figure 7 as well as Figures 4 and 5 extend forward at an angle whereby these bars serve to force the air outward in advance of the plates 3 so that the screw-shaped blades will always have air on which to work. The blades can be made to face inside from outside the propeller should it be desirable, by having them inclined rearward instead of forward as shown. That is, their inclination would be reversed. The blade 3 can be set at any desired angle, and also can be made to cause the air to flow outward or inward.

In the construction here shown any desired form of motor 11 is attached to the shaft 9 and adapted to revolve the shaft and also the propeller.

Attached to the shaft 9 at each end of the propeller are propeller blades 12 and preferably the outer edges of these propeller blades are connected with the inner side of the tubular portion in any desired manner. There will be one or more sets of these propeller blades located at each end of each elongated tubular propeller.

At the right hand end in Figure 3 is shown a propeller designated as 13 which is a counterpart of the propeller shown at the left hand end of Figure 3. This propeller 13 being identical in construction with the propeller at the left hand end of Figure 3 in describing the propeller at the left hand side of the figure the propeller of the right hand side of the figure has been described, making it unnecessary to describe the latter.

Referring now to Figure 2 it will be observed that the improved tubular propeller a is located at one side of the fuselage 1 and the other tubular propeller 13 is located at the other side of the fuselage. These propellers and the engine are supported in any suitable manner by either the fuselage 1 or the wings 2 or as here shown by suitable bars 14 and 15 that have their lower ends connected with the fuselage and their upper ends 16 suitably connected with the wings 2, the bars extending at an angle outward in respect to the fuselage.

The shaft 9 of these propellers and of the motors have their ends journalled in these bars 14 and 15, which bars are located at the rear end of the shaft 9 as well as at the forward ends of the shafts. It is necessary of course that the engines or motive power 11 be connected against rotation and this is accomplished by means of a bar or bars 17 which have their upper portions connected with the fuselage and their lower portions connected also with the fuselage and also connected with the motor.

I desire it understood that the manner of supporting the shafts of these propellers and of these motors may be in any manner desired and it is unnecessary for the understanding of these present improvements, it is believed, to show any well known type of bearing for either the propeller or the motor. Of course it is essential that the motor shafts be mounted concentric with the shafts 3 in any well known manner. It is believed unnecessary for the understanding of this improvement to show any particular manner of constructing the motor shafts or of mounting them since only the ordinary well known type would be shown.

Referring to Figure 2 particular attention is called to the fact that the tubular propeller 13 revolves clockwise and that the propeller a revolves counter-clock-wise. By this it will be understood that the motors and the propellers at opposite sides of the fuselage revolve in opposite directions.

In Figure 2 particular attention is called to the fact that the inner sides of the propellers are enclosed in shell portions 18 which extend substantially half way around the said propellers the shell portions having their ends preferably connected with the said bars 14 and 15 and the central bars 17. The object of this semi-circular enclosing or shell portions is for the purpose of causing the longitudinally extending bars 8 to have a lifting action, and to also cause the blades 3 of the motors to have a lifting action. By this it will be understood that the propellers revolving in the direction shown in Figure 2 and only the outer edges of the propellers acting on the air that the bars 8 and the blades 3 beat the exposed air and that the propellers have a lifting action as well as a propelling action.

It will be understood that the propellers and the motors could be caused to revolve in directions opposite to that here disclosed, and that in that event the semi-circular shell portions 18 would be placed at the outer sides of the propellers instead of at the inner sides but in that event it would reduce the lifting effect of the propellers because of the closeness of the fuselage to the exposed portions of the propellers.

By making the spiral blades 3 scoop shaped, the scoop extending in a direction opposite to the revolution of the propeller and opposite to the direction of propulsion increases the lifting power from what it would be if the said blades were made flat or straight in cross section, which does impair their propelling power.

The inner edges of the bars 8 are connected by any desired number of annular wire rings 19 that extend transverse the tubular propellers. The object of these rings is to tie or hold the inner edges of the bars 8 and serve to hold these edges substantially against vibration.

From the foregoing description it will be apparent that the whole structure is comparatively light and at the same time is sufficiently rigid to serve the function of propelling the airplane and at the same time lifting or tending to lift the said airplane.

By making the propellers have the dual effect of lifting as well as propelling it will be understood that the airplane would be adapted to carry more weight than is possible when the ordinary propeller is used.

This improved propeller therefore has among other advantages the following: It tends to lift the whole structure or it serves to add in addition to the lifting power of the propellers, whereby the load of the machine may be increased over the load of an airplane with the ordinary propeller, and it also serves to enable the machine to land at a greatly reduced speed as compared to the speed of the airplane with the ordinary propeller. It is well known that airplanes when landing must have sufficient speed for the wings to prevent the machine from striking the ground with sufficient force to cause damage when landing, whereas with the improved propeller here described this landing speed can be reduced making the landing in a very much shorter space than is possible with the ordinary airplane and it makes also a structure which will "take off" in much less space than is required for an ordinary airplane.

While the plurality of propellers shown and described are highly desirable for apparent reasons I desire it understood that single propellers located at opposite sides of the fuselage instead of the tandem propellers shown can be used and that under some circumstances a single propeller constructed as covered by the appended claims, could be attached to the movable object.

While I have described in particular detail the structure, I do not limit myself to these details and therefore the appended claims must be construed to cover any structure than can be held within the said claims.

Having thus described my invention what I claim and desire to secure by Letters Patent is:

1. The combination with an airplane having two parallel horizontally elongated tubular propellers having on their outer surfaces spirally arranged outwardly projecting blades, said propellers rotating in opposite directions, means for driving the propellers and shells protecting one side of the propellers and exposing the other side of the propellers, whereby they have the combined effect of propelling the plane and of lifting the same.

2. The combination with an airplane, of a horizontally elongated tubular propeller having on its periphery spirally arranged blades, a plurality of longitudinally and outwardly extending bars also located on the periphery of the said propeller and located within the tubular propeller, vertically and radially arranged blades whereby the structure serves to move the said airplane and to lift the said airplane.

3. A propeller for the purpose described having the dual effect of lifting and propelling, comprising a tubular structure having on its periphery a plurality of outwardly extending blades arranged in spiral relation and a plurality of longitudinally extending bars, means enclosing one side of the said propeller whereby it operates in the manner set forth.

4. The combination with an airplane having a fuselage and laterally extending wings, of two horizontally elongated tubular propellers each located at one side of said fuselage, said propellers being of a length substantially equal to the width of the wings, the propellers having on their periphery a plurality of outwardly extending blades arranged in spiral form and longitudinally and outwardly extending bars located also substantially on the periphery thereof, and means enclosing one side of the blades, said blades revolving in opposite directions, for the purpose set forth.

5. The combination with an airplane having a fuselage provided with laterally extending wings, hollow propellers located adjacent the fuselage, said hollow propellers provided with spiral blades located on their peripheries and longitudinally extending blades extending forward from said spiral blade and means for driving the said propellers.

6. The combination with an airplane having a fuselage and laterally extending wings, of a hollow propeller provided on its periphery with a spirally arranged blade, and longitudinally arranged bars extending from one side of the said blades, and means for driving the propeller.

7. The combination with an airplane having laterally projecting wings, of hollow propellers located at opposite sides of the fuselage, said hollow propellers provided with spiral blades located on their peripheries and horizontally extending bars located at one side of the said blades and means for driving said propellers.

8. The combination with an airplane having a fuselage and laterally projecting wings, of propellers extending longitudinal the fuselage and of a length substantially equal to the width of the said wings, said propellers having located on their periphery spirally arranged blades and also lifting bars extending longitudinal the propellers, each of said propellers having their inner ends separated and driving means connected with the propellers in the separated space, the parts operating as set forth.

9. In an airplane, the combination of a fuselage having laterally extending wings, of two longitudinally extending separated hollow propellers their combined length substantially equal to the width of the wings, each pair of propellers located at opposite sides of the fuselage, said hollow propellers having spiral blades and also longitudinally extending bars which latter blades are arranged substantially radial to the hollow propeller, and driving means located in the said separated space, the parts combined for the purpose specified.

10. The combination in an airplane having a fuselage and laterally extending wings, of hollow propellers having spiral blades located at their periphery and longitudinally and radially extending bars, said blades and bars being interlocked one with the other, for the purpose set forth.

In testimony whereof I hereunto affix my signature.

EDWARD O'TOOLE.